United States Patent
Cendrillon et al.

(10) Patent No.: US 8,891,590 B1
(45) Date of Patent: Nov. 18, 2014

(54) METHOD AND APPARATUS FOR PROCESSING WIRELESS SIGNALS

(71) Applicant: Marvell International Ltd., Hamilton (BM)

(72) Inventors: Raphael Cendrillon, Palo Alto, CA (US); Yakun Sun, Sunnyvale, CA (US); Jiwoong Choi, Mountain View, CA (US); Hui-Ling Lou, Sunnyvale, CA (US)

(73) Assignee: Marvell International Ltd. (BM)

( * ) Notice: Subject to any disclaimer, the term of this patent is extended or adjusted under 35 U.S.C. 154(b) by 92 days.

(21) Appl. No.: 13/627,223

(22) Filed: Sep. 26, 2012

Related U.S. Application Data

(60) Provisional application No. 61/540,149, filed on Sep. 28, 2011.

(51) Int. Cl.
*H04B 1/00* (2006.01)
(52) U.S. Cl.
USPC ........... 375/147; 375/340; 375/346; 375/368; 370/500; 455/67.11; 455/226.1
(58) Field of Classification Search
CPC ......... H04B 2201/70701; H04B 2201/709709; H04B 2201/709718; H04B 1/7113; H04B 1/7117; H04B 1/712; H04L 7/08; H04L 7/10; H04L 25/0226; H04L 25/0228; H04L 25/0232; H04L 25/0236; H04L 25/024; G11B 27/3009; G11B 27/3018
USPC ........... 375/141, 144, 147, 148, 30, 346, 347, 375/365, 368, 366; 370/500, 509–511; 455/67.11, 226.1–226.4
See application file for complete search history.

(56) References Cited

U.S. PATENT DOCUMENTS

| | | | |
|---|---|---|---|
| 8,462,895 B2 * | 6/2013 | Lovell | 375/340 |
| 8,611,340 B2 * | 12/2013 | McCloud et al. | 370/352 |
| 2008/0219371 A1 * | 9/2008 | Hong et al. | 375/260 |
| 2009/0052518 A1 * | 2/2009 | Iwagami | 375/240 |
| 2010/0002788 A1 * | 1/2010 | Wu et al. | 375/260 |

* cited by examiner

*Primary Examiner* — Dac Ha

(57) ABSTRACT

Systems, methods, and other embodiments associated with processing wireless signals. According to one embodiment, a wireless receiver includes at least one antenna configured to receive a wireless signal. The wireless signal comprises pilot symbols dispersed irregularly throughout a two-dimensional grid. The pilot symbols of the wireless signal are usable by the wireless receiver to estimate the wireless channel at each point in the two-dimensional grid. The wireless receiver includes a pattern logic including hardware configured to generate additional pilot symbols in the two-dimensional grid. The additional pilot symbols generated by the pattern logic along with the pilot symbols dispersed irregularly throughout the two-dimensional grid form a regular distribution of pilot symbols in the two-dimensional grid. The wireless receiver is configured to estimate the wireless channel at each point in the two-dimensional grid based on the regular distribution of pilot symbols in the two-dimensional grid.

20 Claims, 7 Drawing Sheets

METHOD AND APPARATUS FOR PROCESSING WIRELESS SIGNALS

CROSS REFERENCE TO RELATED APPLICATIONS

This patent disclosure claims the benefit of U.S. provisional application Ser. No. 61/540,149 filed on Sep. 28, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Efficiently processing wireless signals is a complex task. Several difficulties may be encountered when attempting to efficiently process wireless signals in a wireless receiver. For example, processing a wireless signal according to a two-dimensional technique is overly complex for most implementations because complex hardware is typically required in such applications. Thus, a trade off for a less complex processing solution may be implemented. In one example, this may include one-dimensional processing techniques. However, one-dimensional processing can suffer from processing inefficiencies. Processing inefficiencies for a one-dimensional technique arise when, for example, channel conditions associated with a wireless signal fall outside of an operational range for an implemented solution. Thus as the wireless signal is influenced by changing channel conditions, processing efficiency can be reduced.

For example, a conventional wireless network interface card (NIC) that implements a low complexity solution to process wireless signals received from a wireless access point is typically tuned to perform well for a specific set of channel conditions (e.g., slowly changing frequency selectivity) associated with the wireless signal. However, when the channel conditions fall outside of the specific set of channel conditions (e.g., quickly changing frequency selectivity), processing becomes inefficient and system performance suffers. The processing can become inefficient due to an irregular distribution of pilot symbols in the wireless signal that the NIC processes in a predefined order to account for the channel conditions.

SUMMARY

In general, in one aspect this specification discloses a wireless receiver. The wireless receiver includes at least one antenna configured to receive a wireless signal through a wireless channel. The wireless signal comprises pilot symbols dispersed irregularly throughout a two-dimensional grid. The pilot symbols of the wireless signal are usable by the wireless receiver to estimate the wireless channel at each point in the two-dimensional grid. The wireless receiver includes a pattern logic including hardware configured to, prior to the wireless receiver estimating the wireless channel at each point in the two-dimensional grid, generate additional pilot symbols in the two-dimensional grid. The additional pilot symbols generated by the pattern logic along with the pilot symbols dispersed irregularly throughout the two-dimensional grid form a regular distribution of pilot symbols in the two-dimensional grid. The wireless receiver is configured to estimate the wireless channel at each point in the two-dimensional grid based on the regular distribution of pilot symbols in the two-dimensional grid.

In general, in another aspect, this specification discloses a method. The method includes receiving, in a wireless receiver that includes hardware, a wireless signal through a wireless channel. The wireless signal comprises pilot symbols dispersed irregularly throughout a two-dimensional grid. The pilot symbols of the wireless signal are usable by the wireless receiver to estimate the wireless channel at each point in the two-dimensional grid. The method includes generating additional pilot symbols in the two-dimensional grid to form a regular distribution of pilot symbols in the two-dimensional grid. The additional pilot symbols along with the pilot symbols dispersed irregularly throughout the two-dimensional grid form the regular distribution of pilot symbols. The method also includes estimating, in the wireless receiver, the wireless channel based, at least in part, on the regular distribution of pilot symbols in the two-dimensional grid.

In general, in another aspect, this specification discloses a wireless receiver. The wireless receiver includes a pattern logic including hardware configured to add additional pilot symbols to a pattern of pilot symbols that are dispersed irregularly throughout a wireless signal. The additional pilot symbols form a regular distribution of pilot symbols in the pattern when added to the pattern that includes the pilot symbols that are dispersed irregularly throughout the wireless signal.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with processing wireless signals. In one embodiment, a system is provided to process wireless signals that have an irregular distribution of pilot symbols. For example, in one embodiment, a wireless signal having a regular distribution of pilot symbols, as plotted in a two-dimensional grid having a frequency domain axis and a time domain axis, is created from an irregular distribution of pilot symbols (as plotted in the two-dimensional grid). In this way, the distribution of the pilot symbols is made regular, which permits a processing efficiency of the wireless signal to be maintained even as channel conditions for the wireless signal change.

Figure 1:
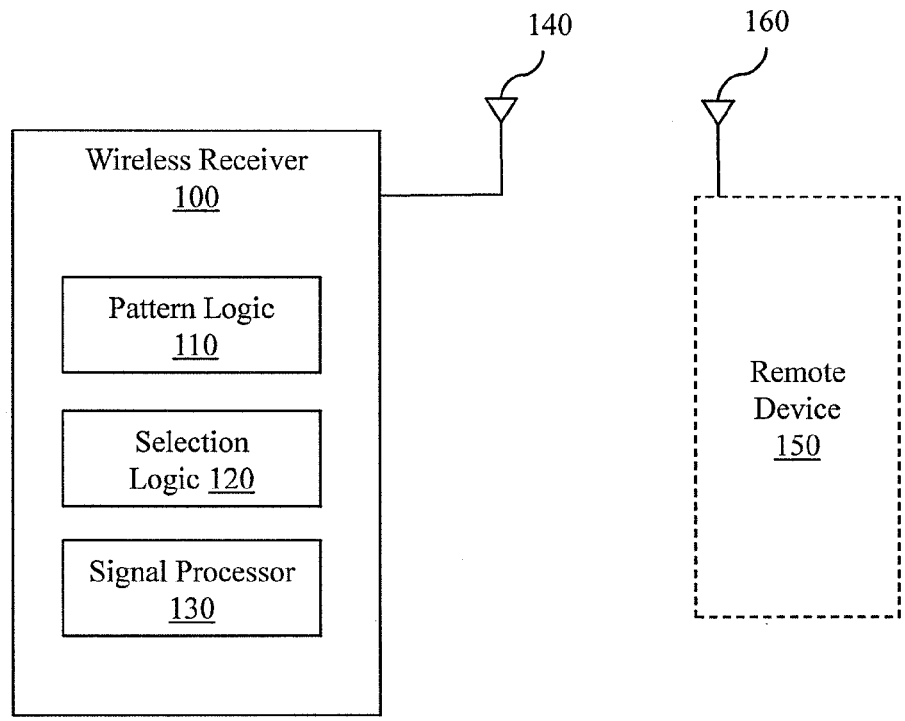
FIG. 1 illustrates one embodiment of a wireless receiver associated with regularizing a distribution of pilot symbols in a grid.

FIG. 1 illustrates one embodiment of a wireless receiver 100 associated with generating pilot symbols (referred to herein as "filler pilot symbols") to regularize a distribution of pilot symbols in a grid of a wireless signal. The wireless receiver 100 includes pattern logic 110, selection logic 120, and a signal processor 130 for processing the wireless signal. The wireless receiver 110 also includes at least one antenna 140 for receiving a wireless signal. In one embodiment, the pattern logic 110 is configured to generate the filler pilot symbols to create a uniform distribution of pilot symbols.

Figure 2:
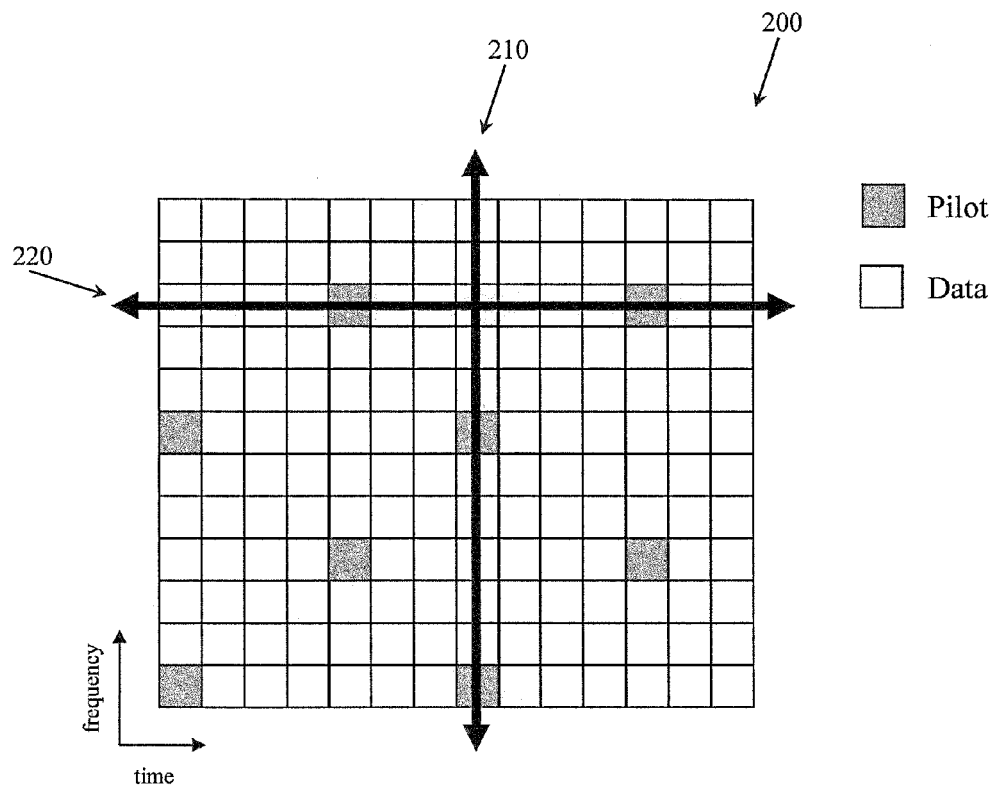
FIG. 2 illustrates an example of a grid of data and pilot symbols.

The grid is, for example, a frame of data from the wireless signal that is organized in a two-dimensional grid (e.g., different frequency sub-carriers on the y-axis vs. time on the x-axis, as in FIG. 2). Each block in a column in the grid represents a data value of a different frequency sub-carrier at a different point in time. In one embodiment, the wireless receiver 100 is configured to estimate a wireless channel over which the wireless receiver 100 receives the wireless signal. The wireless receiver 100 estimates the wireless channel at each block in the two-dimensional grid based on the regular distribution of pilot symbols in the two-dimensional grid to, for example, recover data in the wireless signal from noise and other effects from the wireless channel.

In one embodiment, the pattern logic 110 generates the filler pilot symbols by interpolating using the pilot symbols that are already present in the grid. In one implementation, the pilot symbols already present in the wireless signal correspond to pilot symbols generated and inserted into the wireless signal by a transmitter (e.g., remote device) of the wireless signal. The pattern logic 110 then adds/embeds the filler pilot symbols (also referred to herein as additional pilot symbols) in the grid to fill-in a pattern of pilot symbols in the grid. Adding the filler pilot symbols to the grid creates a uniform distribution of pilot symbols throughout the pattern. The signal processor 130 can then process the wireless signal without regard to whether wireless channel conditions associated with the wireless signal change.

The following example is described from the context that the wireless signal is a wireless communication sent from a remote device 150 to the wireless receiver 100. The remote device 150 includes an antenna 160 for wirelessly transmitting and receiving signals. The remote device 150 can be a wireless device that is capable of communicating with the wireless receiver 100. In one embodiment, the wireless receiver 100 is configured to wirelessly communicate with other devices by sending and receiving orthogonal frequency domain multiplexing (OFDM) signals. An OFDM signal is a data carrier signal that includes multiple frequency sub-carriers.

The wireless receiver 100 is, for example, a wireless communications device that is compatible with IEEE 802.16 standard, $3^{rd}$ Generation Partnership Project Long Term Evolution (LTE) standard, IEEE 802.11 standard, and so on. Additionally, the wireless receiver 100 can be integrated with or in communication with a cellular phone, a smartphone, a handheld device, a wireless network interface card (NIC), and so on.

Consider one example of a wireless signal sent from the remote device 150 to the wireless receiver 100. Further consider FIG. 2, which illustrates one example of a grid 200 of the wireless signal. The grid 200 is a frame or reference block of the wireless signal that includes data and the pilot symbols. The grid 200 is composed of blocks of data and pilot symbols in an arrangement of 12×14 with the pilot symbols arranged in a pattern that is characterized by a non-uniform distribution. The pattern is non-uniform or irregular in the grid 200 because the pilot symbols do not occur regularly in both time and frequency. The pilot symbols are sparsely intermixed with the data.

The remote device 150 arranges the pilot symbols in the grid 200 of the wireless signal and transmits the wireless signal over a wireless channel. The wireless receiver 100 knows the pattern of the pilot symbols prior to receiving the wireless signal (e.g., the pattern of pilot symbols is pre-determined and stored in memory). Accordingly, upon receiving the wireless signal, the pattern logic 110 is configured to analyze the wireless signal to identify the pilot symbols and determine their pattern. Thus, in one embodiment, the wireless receiver 100 uses the pilot symbols in the grid 200 to estimate the wireless channel (e.g., effects of the wireless channel on the wireless signal) at the data symbols that are pre-determined pilot symbols in the grid 200. The wireless receiver 100 uses, for example, the estimate of the wireless channel at the pre-determined pilot symbols to estimate the wireless channel at other blocks in the grid 200 using interpolation.

Consider that at the intersection of column 210 and row 220 (shown as the intersection of the two arrows) there is no pilot symbol. However, both column 210 and row 220 include pilot symbols. Thus, the pattern is non-uniform or irregular in the grid 200 because a pilot symbol is missing from the intersection. Accordingly, the pilot symbols do not occur regularly in both a time domain (x-axis) and a frequency domain (y-axis).

Figure 3:
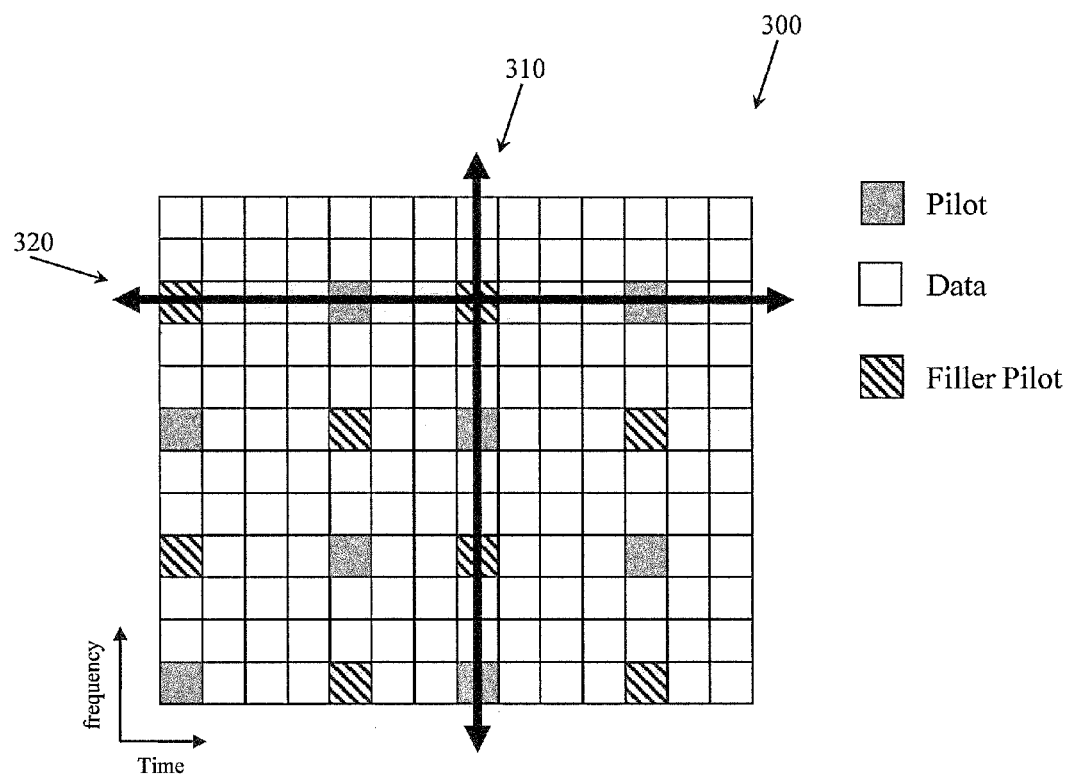
FIG. 3 illustrates an example of a grid after filler pilot symbols have been generated.

Now, consider FIG. 3, which illustrates a grid 300 of the wireless signal after the pattern logic 110 has generated and added pilot symbols (filler pilot symbols) to the grid 300. In grid 300, the pattern of the pilot symbols has been made regular in both the time and frequency domains by generating and adding pilot symbols (filler pilot symbols) at the intersections of rows and columns (e.g., column 310 and row 320) that already included pilot symbols. The terms additional pilot symbols and filler pilot symbols are used in this disclosure to indicate blocks in a grid of the wireless signal where the channel is estimated to regularize the pattern and not a presence of actual pilot symbols that are added by the remote device 150 to the wireless signal. For example, pilot symbols inserted into the wireless signal will be in an irregular pattern and the wireless receiver 100 estimates the channel at blocks in the grid in order to provide additional data points that regularize the grid. The additional data points are the additional/filler pilot symbols and are generated as a preliminary step to estimating the wireless channel over the whole grid.

In one embodiment, before the pattern logic 110 generates the filler pilot symbols in the grid 200 of FIG. 2, the selection logic 120 is configured to determine a type of selectivity associated with the wireless signal (e.g., a selectivity of the wireless channel). The selection logic 120 determines the type of selectivity of the wireless channel so that an efficient method of generating the filler pilot symbols can be selected. By knowing the type of selectivity, the selection logic 120 can select a method of generating the filler pilot symbols and control the pattern logic 110 to generate the filler pilot symbols using the selected method.

For example, suppose that as the wireless signal propagates from the remote device 150 to the wireless receiver 100 channel conditions influence how the wireless signal is received at the wireless receiver 100. The channel conditions (also known as environmental conditions) can introduce time selectivity and/or frequency selectivity into the wireless signal. Examples of the channel conditions include scattering (e.g., multipath delay), fading, delay spread, Doppler shift, and so on. The channel conditions change depending on whether the wireless receiver 100 is moving or still, whether the wireless receiver 100 is in a rural or urban location, and so on.

In one embodiment, the selection logic 120 uses the pilot symbols inserted in the grid by the remote device 150 to measure the frequency selectivity and the time selectivity. For example, the selection logic 120 measures the frequency selectivity from an amount of change between two pilot symbols in the frequency domain. The selection logic 120 can use the amount of change between several sets of pilot symbols in the frequency domain to generate an average value that quantizes a frequency selectivity of the wireless channel. In a similar manner, the selection logic 120 is configured to measure an amount of change between pilot symbols in the time-domain to quantize the time selectivity.

In this way, the selection logic 120 can quantize the selectivity of the wireless channel and control the pattern logic 110 to generate the filler pilot symbols according to the type of selectivity of the wireless channel that influences the wireless signal. The selection logic 120 is configured to select a processing domain (e.g., time or frequency) with a lower selectivity than the other domain. Alternatively, the selection logic 120 can select a weighted average of interpolations in both domains when, for example, the selectivity of the wireless channel denotes both time and frequency selectivity.

For example, if the wireless channel is more frequency selective, then the selection logic 120 controls the pattern logic 110 to generate the filler pilot symbols by interpolating in the time domain. Likewise, if the wireless channel is more time selective, then the selection logic 120 controls the pattern logic 110 to generate the filler pilot symbols by interpolating in the frequency domain. Furthermore, the selection logic 120 can control the pattern logic 110 to interpolate in both the frequency and the time domain and use a weighted average of resulting values when the wireless channel is doubly selective (see equation (1)).

$$X_{filler\ Pilot} = WX_{time\ filler} + (1-W)X_{freq\ filler} \quad (1)$$

Consider an example where the wireless channel is doubly selective and includes interference in both the time domain and the frequency domain. If the selectivity is 40% time selective and 60% frequency selective, then assigning a value of 0.6 to w results in the interpolated value of the filler pilot symbol (x in equation (1)) being 40% from a frequency interpolation and 60% from a time interpolation.

Figure 4:
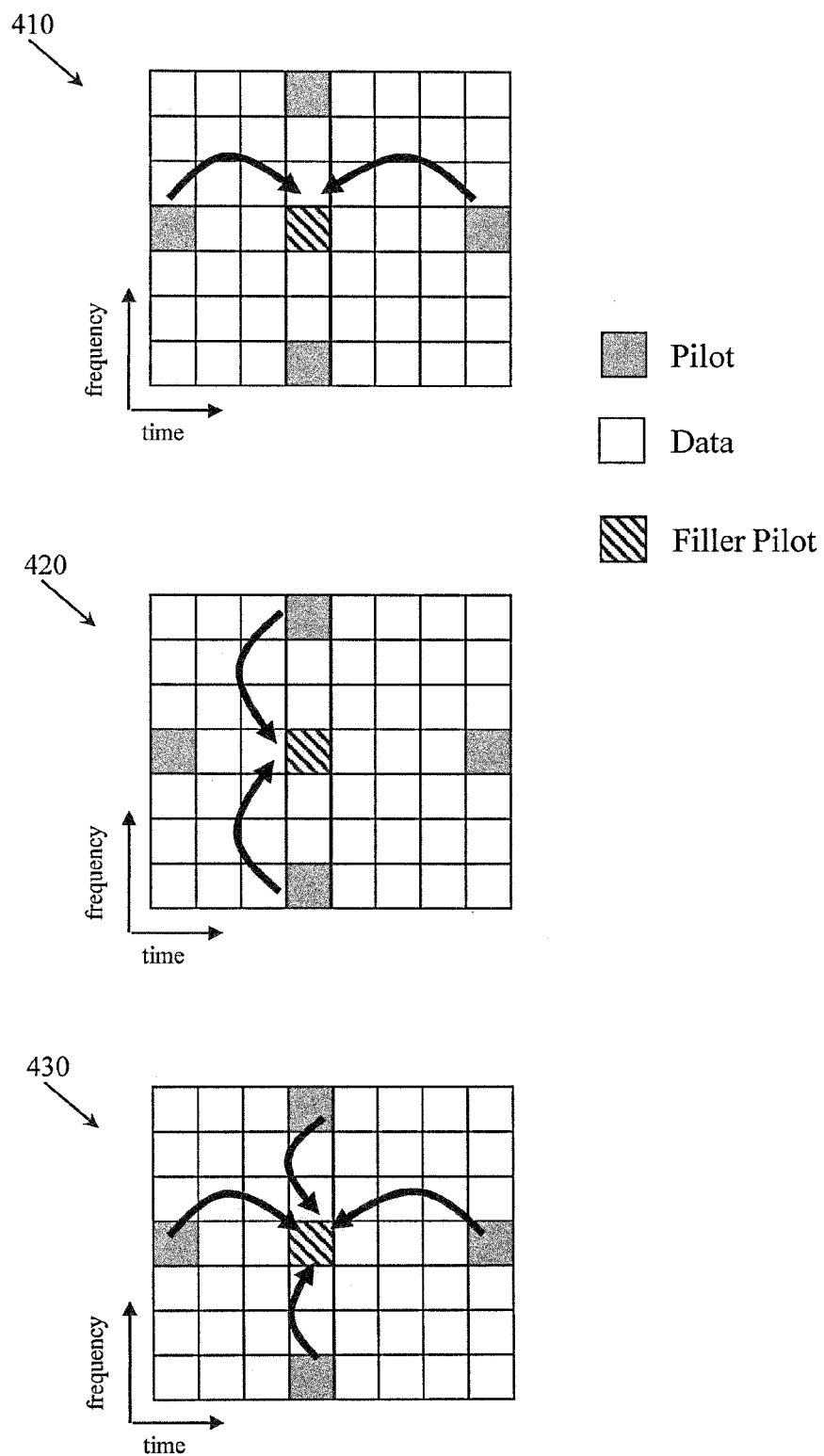
FIG. 4 illustrates different examples of interpolating filler pilot symbols.

Interpolating the filler pilot symbols will be discussed in greater detail with reference to FIG. 4. FIG. 4 illustrates three segments 410, 420, and 430 of a grid (e.g., grid 200 of FIG. 2). Each of the three 7×8 segments of the grid illustrate different examples of generating a filler pilot symbol. In segments 410, 420, and 430, the y-axis illustrates frequency and the x-axis illustrates time. Each individual square is a different symbol that is either data or a pilot symbol. The segment 410 illustrates how the pattern logic 110 is configured to generate a filler pilot symbol by interpolating the filler pilot symbol from two different pilot symbols that are both in the time domain. The two pilot symbols in the time domain are time neighbors. The pattern logic 110 uses the time neighbors to generate the filler pilot symbol when the frequency selectivity indicates a high frequency selectivity (i.e., quickly changing values in the frequency domain), but more stable values in the time domain. In this way, generating the filler pilot symbol is more efficient.

The segment 420 illustrates how the pattern logic 110 is configured to generate a filler pilot symbol by interpolating between two different pilot symbols that are both in the frequency domain. The two pilot symbols in the frequency domain are frequency neighbors. The pattern logic 110 uses the frequency neighbors to generate the filler pilot symbol when the time selectivity indicates a high time selectivity (i.e., quickly changing values in the time domain), but more stable values in the frequency domain.

The segment 430 illustrates how the pattern logic 110 is configured to generate a filler pilot symbol by interpolating in both domains and using a weighted average of both interpolations to produce the filler pilot symbol. The pattern logic 110 uses the weighted average of interpolations in the frequency and time domains when the wireless channel is doubly selective. The weighted average provides a more accurate interpolation of the filler pilot symbol when the wireless channel is doubly selective.

In one embodiment, interpolating a filler pilot symbol in the time domain can involve more than the two time neighbors (e.g., with a higher order filter in the segment 410). Similarly, more than two frequency neighbors can be used for interpolating a filler pilot symbol in the frequency domain. Additionally, using more than two time neighbors, and more than two frequency neighbors can be extended to instances where a weighted average of interpolation in the time domain and an interpolation in the frequency domain occurs to generate a filler pilot symbol. There the number of neighbors used in the time and frequency domain when using a weighted average may also not necessarily be the same, depending, for example, on the selectivity in each respective domain. For example, when the wireless channel associated with the wireless signal is more frequency selective than time selective more time neighbors may be used for an interpolation in the time domain that contributes to a weighted average with an interpolation in the frequency domain, and so on. An interpolator, or a filter to generate the filler pilot symbols, includes but is not limited to a polynomial interpolator, a sinc interpolator, a finite impulse response (FIR) filter, and a Wiener filter. Interpolating filler pilot symbol may also involve only one neighbor in the corresponding domain for complexity reasons.

In one embodiment, other than using a fixed number of pilot neighbors to interpolate the filler pilot symbol, the pattern logic 110 can be controlled by the selection logic 120 to select a number of frequency neighbors, time neighbors, or frequency and time neighbors used to interpolate. The selection logic 120 can determine the number of frequency or time neighbors based, at least in part, on the frequency and/or time selectivity measured in the wireless signal that is associated with the wireless channel.

After the pattern logic 110 finishes regularizing the pattern by generating and adding the filler pilot symbols in the grid, the wireless signal is provided to the signal processor 130 of FIG. 1. Because the pattern of pilot symbols in the grid has been filled-in to produce a uniform distribution of pilot symbols in the grid, the signal processor 130 can be configured to process the wireless signal in either the time domain and then the frequency domain or vice versa without impacting processing efficiency. Accordingly, the signal processor 130 includes a one-dimensional processing pipeline (not illustrated) for processing a wireless signal that includes pilot symbols. In one embodiment, the processing pipeline is configured to process the wireless signal first in the frequency domain and then in the time domain. Alternatively, the processing pipeline is configured to process the wireless signal first in the time domain and subsequently in the frequency domain.

Figure 5:
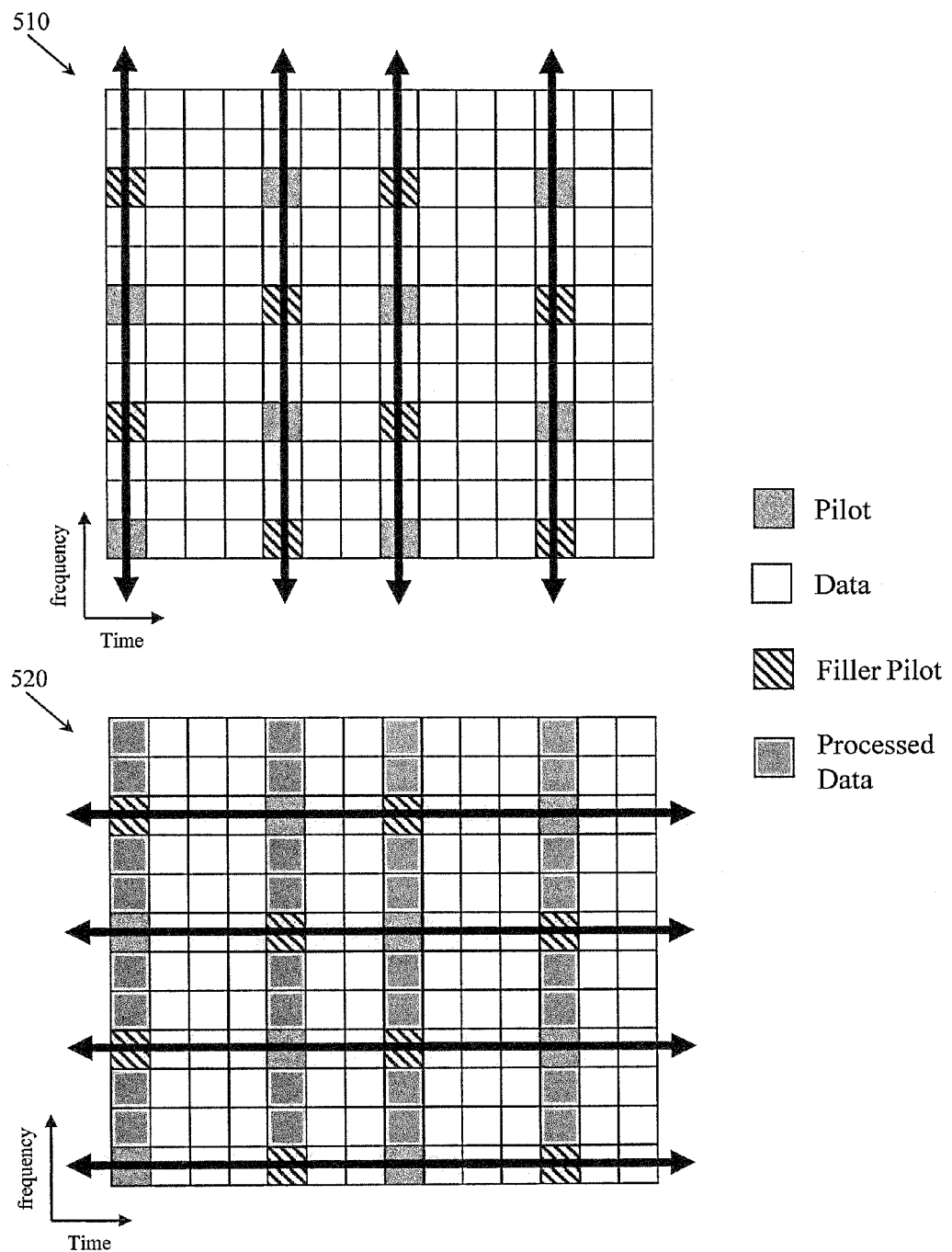
FIG. 5 illustrates an example of processing a wireless signal after the grid is regularized.

FIG. 5 illustrates a grid of data and pilot symbols from a wireless signal at two different stages of processing. The grid, in FIG. 5, is a full grid that has been regularized by adding/embedding the filler pilot symbols. Thus, a distribution of pilot symbols in the gird is uniform/regular. In the example illustrated in FIG. 5, the signal processor 130 first performs one-dimensional frequency domain processing, which interpolates values for data in columns (e.g., y-axis) with pilot pattern symbols, as illustrated by the arrows in grid 510. Because the pilot symbols have already been filled-in (e.g., the channel has been estimated at those points), there are no irregular or large gaps between pilot symbols when interpolating in the frequency domain. In this way, values between the known pilot pattern symbols (both predetermined pilot symbols and additional/filler pilot symbols) are determined without a reduction in processing efficiency.

After performing the frequency domain processing, the signal processor 130 performs time domain processing on the grid 510 that has been partially interpolated. The signal processor 130 is configured to interpolate symbols in the grid 520 in the time domain (x-axis) between the values previously interpolated (shown in a lighter color) and the pilot symbols during frequency domain processing. While FIG. 5 illustrates frequency then time domain processing by the signal processor 130, in other embodiments, the signal processor 130 can be configured to perform time then frequency domain processing just as efficiently since the pattern of pilot symbols in the gird has been regularized. Subsequent grids (i.e., reference blocks) from the wireless signal are processed similarly with the selection logic 120 determining a type of selectivity for each subsequent grid and regularizing the pattern of symbols accordingly before processing.

Figure 6:
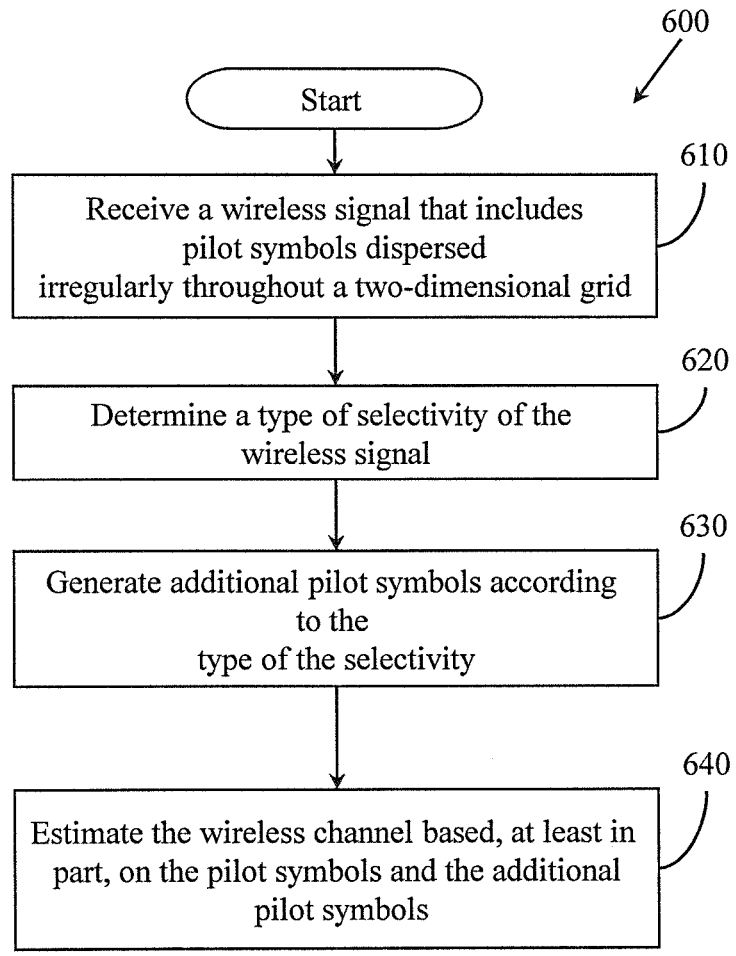
FIG. 6 illustrates one embodiment of a method associated with regularizing a distribution of pilot symbols in a grid.

Further aspects of generating filler pilot symbols to create a uniform distribution of pilot symbols in a grid will be discussed with respect to FIG. 6. FIG. 6 illustrates one embodiment of a method 600 associated with processing a wireless signal by creating a uniform distribution of pilot symbols in a pattern of pilot symbols. Method 600 will be discussed from the perspective of the wireless receiver 100 of FIG. 1.

At 610, the wireless receiver 100 receives a wireless signal through a wireless channel. The wireless signal includes pilot symbols dispersed irregularly throughout a two-dimensional grid (e.g., as in FIG. 2). In one embodiment, the pilot symbols of the wireless signal are usable by the wireless receiver 100 to estimate the wireless channel over the two-dimensional grid. In one embodiment, the wireless receiver 100 may analyze the wireless signal to identify pilot symbols. The pilot symbols may be determined to be distributed in a non-uniform pattern throughout a grid in the wireless signal. The grid is, for example, a reference block or frame of the wireless signal. The grid includes both data and the pilot symbols (e.g., predetermined pilot symbols) arranged in a two-dimensional grid format with a frequency domain axis and a time domain axis.

At 620, the wireless receiver 100 determines a type of selectivity of the wireless channel associated with the wireless signal. The type of selectivity of the wireless channel can be time selective, frequency selective, or selective in both time and frequency (i.e., doubly selective). Time selectivity occurs in the wireless signal when, for example, a value of the wireless signal is quickly changing in the time domain. Time selectivity is introduced into the wireless signal from Doppler shift when the wireless receiver 100 is moving quickly (e.g., moving in a car).

Frequency selectivity occurs in the wireless signal when, for example, a value of the wireless signal is quickly changing in the frequency domain. Frequency selectivity is introduced into the wireless signal from delay spread when the wireless signal experiences multipath propagation delay while traveling to the wireless receiver 100 through the wireless channel (e.g., in an urban environment with many surfaces to reflect from).

Accordingly, at 620, the wireless receiver 100 determines the type of selectivity in the wireless channel by measuring changes in values between pilot symbols in the grid. The wireless receiver 100 measures the changes in the time domain to determine time selectivity and in the frequency domain to determine frequency selectivity. The wireless signal may exhibit a single type of selectivity or a combination of both from effects of the wireless channel on the wireless signal.

Accordingly, at 630, the wireless receiver 100 generates filler pilot symbols according to a single type of selectivity or a combination of both types of selectivity. The wireless receiver 100 generates and adds the filler pilot symbols to the pattern to create a uniform distribution of pilot symbols in the pattern. The filler pilot symbols are generated based, at least in part, on the pilot symbols (e.g., pilot symbols inserted by a transmitting device) that are already present. In one embodiment, the filler symbols are interpolated from the pilot symbols that are already present in the pattern.

For example, the filler pilot symbols can be interpolated using pilot symbols in the frequency domain or using pilot symbols in the time domain. In general, interpolating using pilot symbols in the frequency domain occurs when the wireless signal is time selective and interpolating using pilot symbols in the time domain occurs when the wireless signal is frequency selective. Additionally, the filler pilot symbols can be generated using a weighted average of interpolation in the frequency and time domains when the wireless signal is doubly selective.

At 640, after the pattern of pilot symbols has been regularized by generating and adding the filler pilot symbols to the pattern, the wireless receiver 100 processes the wireless signal. In one embodiment, processing the wireless signal includes interpolating data in the grid by using the pattern of pilot symbols. For example, the processing can include estimating the wireless channel over which the wireless signal is received. Estimating the wireless channel may include interpolating each block in the grid based, at least in part, on the regular distribution of pilot symbols. The wireless channel is estimated to determine an effect on the wireless signal from the wireless channel so that data in the wireless signal can be recovered.

Because the pattern of pilot symbols now includes a uniform/regular distribution of pilot symbols, the processing can occur by first interpolating in the time domain and then in the frequency domain, or by first interpolating in the frequency domain and then in the time domain. The pattern of pilot symbols with the filler pilot symbols permits either order of processing without degrading processing efficiency in a one-dimensional processing pipeline. This is because there is no irregular distribution of pilot symbols to impact processing efficiency. In this way, for example, the wireless receiver 100 includes less hardware (e.g., only one processing pipeline instead of two with different processing orders that are selected based on channel conditions) and still processes wireless signals efficiently regardless of channel conditions associated with the wireless signal.

Figure 7:
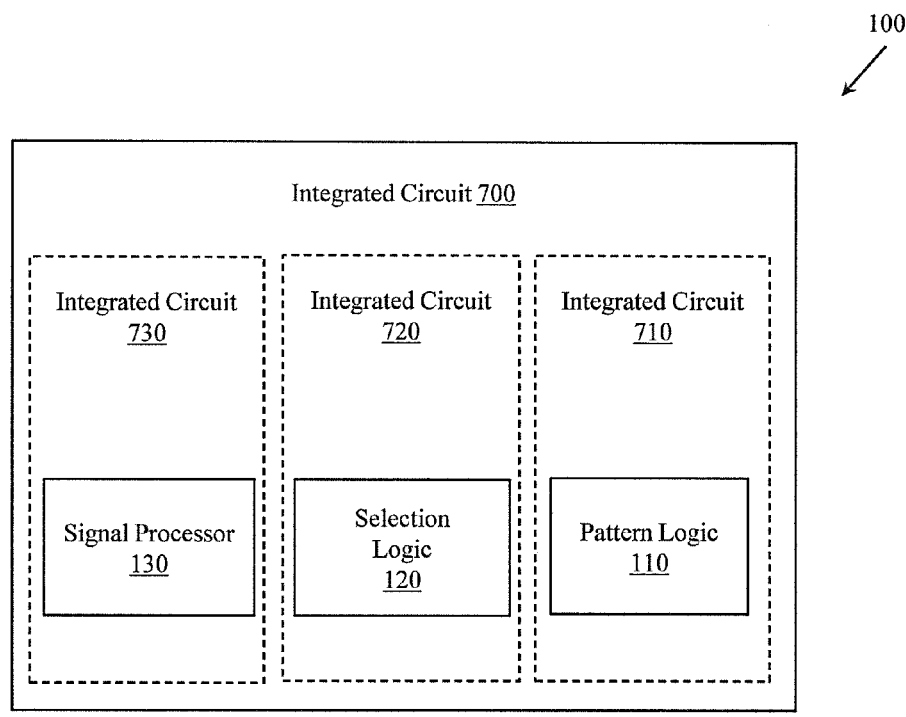
FIG. 7 illustrates one embodiment of an integrated circuit associated with regularizing a distribution of pilot symbols in a grid.

FIG. 7 illustrates an additional embodiment of the wireless receiver 100 from FIG. 1 that is configured with separate integrated circuits and/or chips. In this embodiment, the pattern logic 110 from FIG. 1 is embodied as a separate integrated circuit 710. Additionally, the selection logic 120 is embodied on an individual integrated circuit 720. The signal processor 130 is also embodied on an individual integrated circuit 730. The circuits are connected via connection paths to communicate signals. While integrated circuits 710, 720, and 730 are illustrated as separate integrated circuits, they may be integrated into a common integrated circuit board 700. Additionally, integrated circuits 710, 720, and 730 may be combined into fewer integrated circuits or divided into more integrated circuits than illustrated. In another embodiment, the pattern logic 110, the selection logic 120, and the signal processor 130 (which are illustrated in integrated circuits 710, 720, and 730, respectively) may be combined into a separate application-specific integrated circuit. In other embodiments, portions of the functionality associated with the pattern logic 110 and the selection logic 120 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes hardware, firmware, instructions stored on a non-transitory computer-readable medium, and/or combinations of each to perform a function(s) or an action(s), and/or to cause a function or action from another logic, method, and/or system. Logic may include a microprocessor programmed to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A wireless receiver, comprising:
    at least one antenna configured to receive a wireless signal through a wireless channel, wherein the wireless signal comprises pilot symbols dispersed irregularly throughout a two-dimensional grid, and wherein the pilot symbols of the wireless signal are usable by the wireless receiver to estimate the wireless channel at each point in the two-dimensional grid;
    pattern logic configured to generate additional pilot symbols in the two-dimensional grid, wherein the additional pilot symbols generated by the pattern logic along with the pilot symbols dispersed irregularly throughout the two-dimensional grid form a regular distribution of pilot symbols in the two-dimensional grid,
    wherein the wireless receiver is configured to estimate the wireless channel at each point in the two-dimensional grid based on the regular distribution of pilot symbols in the two-dimensional grid.

2. The wireless receiver of claim 1, wherein the two-dimensional grid has a frequency domain axis and a time domain axis, and wherein each point in the two-dimensional grid corresponds to a location at which data or pilot is embedded within the wireless signal.

3. The wireless receiver of claim 1, further comprising:
    a selection logic configured to select a number of pilot symbols in each domain that are used by the pattern logic when generating the additional pilot symbols.

4. A wireless receiver, comprising:
    at least one antenna configured to receive a wireless signal through a wireless channel, wherein the wireless signal comprises pilot symbols dispersed irregularly throughout a two-dimensional grid, and wherein the pilot symbols of the wireless signal are usable by the wireless receiver to estimate the wireless channel at each point in the two-dimensional grid;
    pattern logic configured to generate additional pilot symbols in the two-dimensional grid, wherein the additional pilot symbols generated by the pattern logic along with the pilot symbols dispersed irregularly throughout the two-dimensional grid form a regular distribution of pilot symbols in the two-dimensional grid,
    wherein the wireless receiver is configured to estimate the wireless channel at each point in the two-dimensional grid based on the regular distribution of pilot symbols in the two-dimensional grid; and a selection logic configured to
    determine a type of selectivity of the wireless channel by determining whether the wireless channel is time selective, frequency selective, or doubly selective, and
    control the pattern logic to generate the additional pilot symbols based, at least in part, on the type of the selectivity of the wireless channel.

5. The wireless receiver of claim 1, wherein the pattern logic is configured to generate the additional pilot symbols in the two-dimensional grid based, at least in part, on:
    an interpolation of the pilot symbols dispersed irregularly throughout the two-dimensional grid in a time domain, or
    an interpolation of the pilot symbols dispersed irregularly throughout the two-dimensional grid in a frequency domain, or
    a weighted average of an interpolation of the pilot symbols dispersed irregularly throughout the two-dimensional grid in both the frequency domain and the time domain.

6. The wireless receiver of claim 1, wherein the regular distribution of pilot symbols is a uniform pattern of pilot symbols in both a time domain and a frequency domain of the two-dimensional grid, and wherein the pattern logic is configured to generate the additional pilot symbols to fill-in intersections between the pilot symbols in rows and columns in the two-dimensional grid to transform a non-uniform pattern of the pilot symbols to the uniform pattern.

7. The wireless receiver of claim 1, further comprising:
    a signal processor configured to estimate the wireless channel at each point in the two-dimensional grid based on the regular distribution of pilot symbols in the two-dimensional grid.

8. A method, comprising:
    receiving a wireless signal through a wireless channel, wherein the wireless signal comprises pilot symbols dispersed irregularly throughout a two-dimensional grid, and wherein the pilot symbols of the wireless signal are usable to estimate the wireless channel at each point in the two-dimensional grid;
    generating additional pilot symbols in the two-dimensional grid to form a regular distribution of pilot symbols in the two-dimensional grid, wherein the additional pilot symbols along with the pilot symbols dispersed irregularly throughout the two-dimensional grid form the regular distribution of pilot symbols; and
    estimating the wireless channel based, at least in part, on the regular distribution of pilot symbols in the two-dimensional grid.

9. The method of claim 8, wherein the two-dimensional grid has a frequency domain axis and a time domain axis, and wherein each point in the two-dimensional grid corresponds to a location at which data is embedded within the wireless signal.

10. The method of claim 8, further comprising selecting a number of pilot symbols in each domain that are used when generating the additional pilot symbols.

11. The method of claim 8, further comprising:
    determining a type of selectivity of the wireless channel by determining whether the wireless channel is time selective, frequency selective, or doubly selective, wherein generating the additional pilot symbols includes generating the additional pilot symbols based, at least in part, on the type of the selectivity of the wireless channel.

12. The method of claim 8, wherein generating the additional pilot symbols is based, at least in part, on
    an interpolation of the pilot symbols dispersed irregularly in the two-dimensional grid in a time domain,
    an interpolation of the pilot symbols dispersed irregularly in the two-dimensional grid in a frequency domain, or
    a weighted combination of an interpolation of the pilot symbols dispersed irregularly in the two-dimensional grid in the frequency domain and in the time domain.

13. The method of claim 8, further comprising:
    estimating, in a signal processor, the wireless channel at each point in the two-dimensional grid based, at least in part, on the regular distribution of pilot symbols in the two-dimensional grid.

14. The method of claim 8, wherein the regular distribution of pilot symbols is a uniform pattern of pilot symbols in both a time domain and a frequency domain of the two-dimensional grid, and wherein generating the additional pilot symbols includes filling-in intersections between the pilot symbols in rows and columns in the two-dimensional grid to transform a non-uniform pattern of the pilot symbols to the uniform pattern.

15. A wireless receiver, comprising:
    at least one antenna configured to receive a wireless signal through a wireless channel, wherein the wireless signal comprises a pattern of pilot symbols dispersed irregularly throughout a two-dimensional grid; and
    a pattern logic configured to add additional pilot symbols to the pattern of pilot symbols that are dispersed irregularly throughout the wireless signal, wherein the additional pilot symbols form a regular distribution of pilot symbols in the pattern when added to the pattern that includes the pilot symbols that are dispersed irregularly throughout the wireless signal.

16. The wireless receiver of claim 15, wherein the pattern logic is configured to generate the additional pilot symbols based, at least in part, on an interpolation of the pilot symbols dispersed irregularly in the pattern in a time domain, and wherein the pattern of pilot symbols is dispersed throughout a two-dimensional grid that includes a frequency domain axis and a time domain axis, and wherein the pattern logic is configured to add the additional pilot symbols to fill-in intersections between the pilot symbols in rows and columns in the two-dimensional grid to transform a non-uniform pattern of the pilot symbols to the uniform pattern.

17. The wireless receiver of claim 15, wherein the pattern logic is configured to generate the additional pilot symbols based, at least in part, on an interpolation of the pilot symbols dispersed irregularly in the pattern in a frequency domain, and wherein the pattern of pilot symbols is dispersed throughout a two-dimensional grid that includes a frequency domain axis and a time domain axis.

18. The wireless receiver of claim 15, wherein the pattern logic is configured to generate the additional pilot symbols based, at least in part, on a weighted combination of an interpolation of the pilot symbols in the pattern in the frequency domain and in the time domain, and wherein the pattern of pilot symbols is dispersed throughout a two-dimensional grid that includes a frequency domain axis and a time domain axis.

19. The wireless receiver of claim 15, further comprising:
    a selection logic configured to select a number of pilot symbols in each domain that are used by the pattern logic when generating the additional pilot symbols.

20. The wireless receiver of claim 15, further comprising selection logic configured to
    determine a type of selectivity of the wireless signal by determining whether the wireless signal is time selective, frequency selective, or doubly selective, and
    control the pattern logic to generate the additional pilot symbols based, at least in part, on the type of the selectivity of the wireless signal.

* * * * *